(12) United States Patent
Lehikoinen (10) Patent No.: US 11,968,572 B1
(45) Date of Patent: Apr. 23, 2024

(54) METHOD AND APPARATUS FOR MANAGING CELLULAR NETWORK

(71) Applicant: Elisa Oyj, Helsinki (FI)

(72) Inventor: Heikki Lehikoinen, Helsinki (FI)

(73) Assignee: Elisa Oyj, Helsinki (FI)

( * ) Notice: Subject to any disclaimer, the term of this patent is extended or adjusted under 35 U.S.C. 154(b) by 0 days.

(21) Appl. No.: 18/392,236

(22) Filed: Dec. 21, 2023

(30) Foreign Application Priority Data

Feb. 23, 2023 (FI) .................................. 20235221

(51) Int. Cl.
*H04W 16/00* (2009.01)
*H04W 36/00* (2009.01)
*H04W 36/08* (2009.01)

(52) U.S. Cl.
CPC ..... *H04W 36/00835* (2018.08); *H04W 36/08* (2013.01)

(58) Field of Classification Search
CPC ..... H04W 16/00; H04W 16/18; H04W 16/24; H04W 16/32; H04W 36/0061; H04W 36/0083; H04W 36/00835; H04W 36/08
See application file for complete search history.

(56) References Cited

U.S. PATENT DOCUMENTS

2022/0256355 A1   8/2022   Wang et al.

FOREIGN PATENT DOCUMENTS

CN   112054943 B   10/2021
WO   2016049592 A1   3/2016

OTHER PUBLICATIONS

Elsaway et al, 'Base Station Ordering for Emergency Call Localization in Ultra-Dense Cellular Networks', IEEE Access, Date of current version Feb. 14, 2018, vol. 6, http://www.ieee.org/publications_standards/publications/rights/index.html, 16 pages.
Finnish Patent and Registration Office, Search Report, FI Application No. 20235221, dated Oct. 12, 2023, 2 Pages.
Finnish Patent and Registration Office, Communication of Acceptance, FI Application No. 20235221, dated Oct. 12, 2023, 8 pages.

*Primary Examiner* — Matthew W Genack
(74) *Attorney, Agent, or Firm* — Ziegler IP Law Group (57) ABSTRACT

Disclosed is a method for managing a cellular network that includes receiving information about a plurality of coverage cells in the cellular network and location coordinates of each coverage cell; generating a triangulation diagram corresponding to the location coordinates of each coverage cell; identifying for a target mapped cell, corresponding to a target coverage cell, neighbouring mapped cells having a shared boundary in the triangulation diagram; determining a length of the shared boundary between the target mapped cell and each one of the neighbouring mapped cells; assigning a ranking to each one of the neighbouring mapped cells based on the corresponding length of the shared boundary with the target mapped cell; and generating a selected neighbour list for the target coverage cell based on the ranking of the corresponding neighbouring mapped cells.

10 Claims, 5 Drawing Sheets

METHOD AND APPARATUS FOR MANAGING CELLULAR NETWORK

TECHNICAL FIELD

The present disclosure generally relates to communication networks; and more specifically, to a method, a computer program and an apparatus for managing a cellular network.

BACKGROUND

An exponential growth in technology has led to the rapid development of various industries such as, telecommunication, manufacturing, networking industries and the like. Specifically, in the telecommunication industry, a rise in the demand of cellular devices is observed that has necessitated installation of an increasing number of cellular base stations and/or cellular networks. Moreover, an exponential growth in the volume of data traffic over such cellular networks is observed i.e., primarily attributed to the rapid increase in the size of subscriber base with access to high-speed networks such as, 3rd generation (3G), 4G and 5G networks and the accessibility of smart phones supporting such intensive bandwidths too has fuelled the increased traffic volume on such cellular networks. Further, an increasing number of people have started utilizing the cellular devices (such as, smartphones) for computationally expensive (or data-heavy) operations, resulting in excessive burden on current base stations that may result in a poor performance or malfunction of the cellular network (or telecommunication systems).

Thus, installation of additional base stations is required to improve transmission between base stations and connected cellular devices. Moreover, the exponential increase in cellular devices spread across the globe requires dense cellular networks and interoperability. However, merely increasing the number of base stations does not alleviate the problems associated with the increased usage and associated unavoidable circumstantial errors that often lead to failure of such base stations. Alternatively stated, increasing the number of base stations may be able to handle higher data traffic. However, the installation of such base stations is an expensive and time-consuming task and potentially hampers surrounding cellular networks during installations.

In some examples, in order to provide an uninterrupted cellular network (even during installation period), it is required to determine the faulty base station(s) i.e., base station(s) that have malfunctioned are determined. However, telecommunication systems or cellular networks may have several thousand base stations and antennas, wherein each base station and antenna may be arranged in different locations across geographical areas. Thus, in order to determine, for example, a closest antenna from any base station, or ten closest base stations or antennas, with respect to each or any of the antennas or base stations in the telecommunication system, distances between each base station are required to be determined.

Currently, information available for each base station in a given cellular network comprises information including, location of the base station (x1, y1) and direction of each of the antennas (referred to as azimuth information). In an example, the base station at location (x1, y1) may have three directional antennas, wherein a first directional antenna is directing towards a compass heading of 0 degrees (i.e., north), a second directional antenna is directing towards a compass heading of 120 degrees (i.e., south east), and a third directional antenna directing towards 240 degrees (i.e., south west). Herein, each of the three directional antennas are operable to cover predefined areas in the associated directions. Correspondingly, for large cellular networks having such peculiar configurations of multiple base stations and antennas, mapping i.e., determination of the each of the base station and antenna configurations of the cellular network, becomes essential. However, such a determination task of identification and maintenance of each of the base stations and/or the associated directional antennas of the cellular network is computationally expensive owed to the requirement of heavy simulations and/or on-site measurements associated with the cellular network and the elements therein. Furthermore, in case if there is change in topology of the telecommunication (or cellular) network, the generated table has to recalculated for each change, since drop-off (or addition) of any additional base station impacts the closest base station(s) within a certain range. For example, a change in the topology of the cellular network can take place during power loss, or during reconfiguration to operate at a different frequency, or during installation of other antennas or base stations.

Therefore, in light of the foregoing discussion, there exists a need to overcome the aforementioned drawbacks of conventional solutions and provide a faster, improved and/or efficient method for managing the cellular network.

SUMMARY

The present disclosure seeks to provide a method for managing a cellular network. The present disclosure also seeks to provide an apparatus for managing a cellular network. The present disclosure also seeks to provide a computer program operable to execute the method of the present disclosure. An aim of the present disclosure is to provide a solution that overcomes at least partially the problems encountered in prior art.

In a first aspect, an embodiment of the present disclosure provides a method for managing a cellular network, the method comprising:
  receiving information about a plurality of coverage cells in the cellular network and location coordinates of each coverage cell of the plurality of coverage cells;
  generating a triangulation diagram with each one of the plurality of coverage cells being considered as one of point sites in a plane corresponding to the location coordinates of each coverage cell of the plurality of coverage cells, the triangulation diagram comprising a plurality of mapped cells representative of the plurality of coverage cells in the cellular network;
  identifying for a target mapped cell, corresponding to a target coverage cell, neighbouring mapped cells from the plurality of mapped cells having a shared boundary in the triangulation diagram;
  determining a length of the shared boundary between the target mapped cell and each one of the neighbouring mapped cells;
  assigning a ranking to each one of the neighbouring mapped cells based on the corresponding length of the shared boundary with the target mapped cell, with neighbouring mapped cell of the neighbouring mapped cells having comparatively larger of the corresponding length of the shared boundary with the target mapped cell being assigned higher of the ranking; and
  generating a selected neighbour list for the target coverage cell comprising at least one of other of the plurality of coverage cells in the cellular network based on the ranking of the corresponding neighbouring mapped cells.

In a second aspect, an embodiment of the present disclosure provides an apparatus comprising at least one server, a database, and a computer program stored in a memory, the computer program being configured together with said at least one server and database to control the apparatus to perform the method according to the first aspect.

In a third aspect, an embodiment of the present disclosure provides a computer program comprising computer executable program code, when executed the program code controls a computer to perform the method according to the first aspect.

Embodiments of the present disclosure substantially eliminate or at least partially address the aforementioned problems in the prior art, and enable reliable and computationally resource-efficient mechanism for managing a cellular network, specifically to determine proximal antenna and/or base stations to each of the one or more directional antennas or base stations in the cellular network.

Additional aspects, advantages, features and objects of the present disclosure would be made apparent from the drawings and the detailed description of the illustrative embodiments construed in conjunction with the appended claims that follow.

It will be appreciated that features of the present disclosure are susceptible to being combined in various combinations without departing from the scope of the present disclosure as defined by the appended claims.

BRIEF DESCRIPTION OF THE DRAWINGS

The summary above, as well as the following detailed description of illustrative embodiments, is better understood when read in conjunction with the appended drawings. For the purpose of illustrating the present disclosure, exemplary constructions of the disclosure are shown in the drawings. However, the present disclosure is not limited to specific methods and instrumentalities disclosed herein. Moreover, those skilled in the art will understand that the drawings are not to scale. Wherever possible, like elements have been indicated by identical numbers.

Embodiments of the present disclosure will now be described, by way of example only, with reference to the following diagrams wherein.

In the accompanying drawings, an underlined number is employed to represent an item over which the underlined number is positioned or an item to which the underlined number is adjacent. A non-underlined number relates to an item identified by a line linking the non-underlined number to the item. When a number is non-underlined and accompanied by an associated arrow, the non-underlined number is used to identify a general item at which the arrow is pointing.

DETAILED DESCRIPTION OF EMBODIMENTS

The following detailed description illustrates embodiments of the present disclosure and ways in which they can be implemented. Although some modes of carrying out the present disclosure have been disclosed, those skilled in the art would recognize that other embodiments for carrying out or practising the present disclosure are also possible.

The present disclosure provides a method for managing a cellular network. Throughout the present disclosure, the term "cellular network" as used herein refers to a communication network that links (or connects) a group of electronic devices (or nodes) to each other i.e., interconnected via the communication links for enabling communication between the electronic devices in the cellular network such as, for exchanging information. The cellular network (also, referred to as a telecommunication system or network) may comprise multiple components therein such as, cell towers or base stations, directional antennas (sometimes simply referred to as antennas), links and switches between each of the group of electronic devices therein to enable communication therebetween. In an example, the cellular network includes, but is not limited to, a Global System for Mobile Communications (GSM) network, Code-Division Multiple Access (CDMA) network, Time-Division Multiple Access (TDMA) network, Frequency-Division Multiple Access (FDMA) network, Space-Division Multiple Access (SDMA) network, Advanced Mobile Phone System (AMPS) network, General Packet Radio Service (GPRS) network, Evolution-Data Optimized (EV-DO) network, Enhanced Data Rates for GSM Evolution (EDGE) network, Universal Mobile Telecommunications System (UMTS) network, Digital Enhanced Cordless Telecommunications (DECT) network, Integrated Digital Enhanced Network (iDEN), 2G, 3G, 4G, 5G, LTE networks and associated radio waves, and so forth. In this regard, the cellular network provides communication abilities to the electronic device(s) to perform the assigned tasks thereto. Further, the term "managing" in respect to the cellular network, as used herein, relates to monitoring, reconfiguration, and maintenance of the cellular network, wherein the cellular network may be configured to provide communication capabilities to a plurality of interconnected nodes associated therewith.

It will be appreciated that the electronic device as associated with (or used by) a user is intended to be broadly interpreted to include any device that may be used for data communication over a wireless communication network (or the cellular network). Examples of the electronic device include, but are not limited to, cellular phones, personal digital assistants (PDAs), handheld devices, wireless modems, laptop computers, personal computers, etc. In addition, the electronic device includes a display, a camera, a memory device, a processing arrangement, a communication interface. Furthermore, the electronic device is operable by any entity such as a person (i.e., human being) or a virtual program (such as, an autonomous program or a bot).

Currently, information available for each base station in a given cellular network comprises information including, number of base stations in the cellular network, location of each of the base stations, and direction of each of the antennas (referred to as azimuth information) in each of the base stations. Consequently, for large cellular networks having such peculiar configurations of multiple base stations and antennas, mapping i.e., determination of the each of the base station and antenna configurations of the cellular network, becomes essential. However, with conventional approach, such a determination task of identification and maintenance of each of the base stations and/or the associated directionals antennas of the cellular network is computationally expensive owed to the requirement of heavy simulations and/or on-site measurements associated with the cellular network and the elements therein. In light of the aforementioned discussion, the present disclosure provides a reliable, effective and efficient method for managing such cellular network.

The method comprises receiving information about a plurality of coverage cells in the cellular network and location coordinates of each coverage cell of the plurality of coverage cells. The term "coverage cell" as used herein refers to a cell site (or cell phone tower or cellular base station) wherein any electrical or electronic element (or device) may be configured within the cellular network. For example, the coverage cell may be associated with a base station (or cell tower), or a directional antenna, or both. The term "coverage" as used herein refers to a geographic area associated with the base station or directional antenna, wherein said base station or directional antenna may communicate therein. Herein, the information received comprises information associated with the plurality of coverage cells in the cellular network and location coordinates of each coverage cell of the plurality of coverage cells. Herein, each of the plurality of coverage cells is representative of, or associated with, one or more base stations and/or antennas, wherein the information received about the location coordinates of each coverage cell of the plurality of coverage cells enables the method to efficiently map each coverage cell to enable effective management of the cellular network. Optionally, the received information further comprises an Azimuth for each of one or more directional antennas in each of the coverage cells. Alternatively stated, for improved granular control, the received information further comprises location coordinates and Azimuth of the one or more directional antennas associated with the plurality of coverage cells in the cellular network.

The plurality of coverage cells in the cellular network are configured to exchange electromagnetic signals with encoded data such as, in the form of 0 or 1-bit, or on-off electric signals. Generally, the coverage cell serves as a central connection point for the electronic devices to communicate via the cellular network. Further, the coverage cell connects the electronic devices to other networks and/or devices, through dedicated high bandwidth either wired or wirelessly. The coverage cell may comprise one or more radio frequency (RF) antennas to transmit and receive RF signals to other connected devices. The coverage cells in the cellular networks may be referred to as cell towers, wherein each electronic device may connect to the cell tower in order to connect to the cellular network, the internet or other electronic devices. In an example, the base station at location (x1, y1) may have three directional antennas, wherein a first directional antenna is directing towards a compass heading of 0 degrees (i.e., north), a second directional antenna is directing towards a compass heading of 120 degrees (i.e., south-east), and a third directional antenna directing towards 240 degrees (i.e., south-west). Herein, each of the three directional antennas are operable to cover predefined areas in the associated directions.

The term "base station" as used herein refers to a node or a relay in the cellular network configured to provide a central connection point for the electronic devices to communicate therebetween. Notably, the plurality of base stations is responsible for enabling and maintaining communication between the cellular network, the nodes therein, and the associated users, and also amongst the users. The plurality of the base stations may comprise a radio receiver and one or more antennas associated with each base station that enable furthers connection with electronic user devices (such as, cellular devices) to enable mobile telephony, wireless communications, and wireless computer networking. In particular, the plurality of the base stations is configured to provide a central hub of connections for communication and transmission of data with other electronic devices in the cellular network. For example, a base station may have 3 directional antennas, each antenna covering a region (or sector) of about 120 degrees or having regions (or sectors) defined by successive azimuths of 120-degree intervals i.e., 0, 120, and 240 degrees with respect to true North.

The term "directional antenna" refers (or beam antenna) refers to antennas configured to radiate or receive higher amounts of power in specific directions allowing an increased performance and reduced interference from unwanted sources during operation. The one or more directional antennas of the plurality of base stations provide increased performance in comparison to other types of antennas, such as, dipole antennas or omnidirectional antennas, wherein greater concentration of radiation in a specified direction is desired. For example, the one or more directional antennas may be a high-gain antenna (HGA), or a low-gain antenna (LGA).

The information about the plurality of coverage cells in the cellular network relates to data associated with the coverage cells required for access and/or management of the plurality of coverage cells in the cellular network. Herein, such information about the plurality of coverage cells and/or the associated one or more directional antennas in the cellular network may be obtained by accessing databases or requesting from a data source associated with the cellular network. Herein, the information includes at least one of, network and device identifiers, information associated with cellular network vendors, device technology, device frequency, operational parameters, device capabilities, other supplementary information required to build different relation mappings of the plurality of coverage cells and/or the one or more associated directional antennas in the cellular network.

Further, the present method comprises receiving location coordinates of each of the plurality of coverage cells in the cellular network. The term "location coordinate" as used herein refers to an information about the geographical position of each one of the plurality of coverage cells. Herein, the location information may be in geodetic (latitude/longitude) format. Suitably, the location coordinate of each of the plurality of base enables the present method for mapping thereof in order to generate a representation of the plurality of the coverage cells. It will be appreciated that each of the plurality of the coverage cells has a unique location coordinate and effective mapping of the plurality of coverage cells which enables managing of the cellular network in an efficient manner.

As discussed, the present method also comprises receiving information about Azimuth for each of one or more directional antennas in each coverage cell of the plurality of coverage cells. As used herein, the term "Azimuth" refers to an azimuth (az) angle or value i.e., a compass bearing or direction, relative to true (geographic) north or a customized reference direction, associated with each of the one or more directional antennas in each coverage cell of the plurality of coverage cells. Beneficially, the information about the location coordinates of the plurality of coverage cells and the one or more directional antennas associated therewith, along with the Azimuth for each of the one or more directional antennas in each coverage cell of the plurality of coverage cells enables the present method to accurately map each of the elements of the cellular network for generation of accurate representations to enable effective management thereof. As discussed later in the present disclosure, the provided information, location coordinates, and Azimuth of the plurality of coverage cells, and the associated one or more directional antennas, may be utilized in the generation of unique triangulation diagrams as per embodiments of the present disclosure.

The method further comprises generating a triangulation diagram with each one of the plurality of coverage cells being considered as one of point sites in a plane corresponding to the location coordinates of each coverage cell of the plurality of coverage cells, the triangulation diagram comprising a plurality of mapped cells representative of the plurality of coverage cells in the cellular network. Upon receiving the information receiving information about a plurality of coverage cells in the cellular network and location coordinates thereof, the method further comprises generating the triangulation diagram representative of the plurality of coverage cells in the cellular network based on location coordinates of each coverage cell, wherein each of the plurality of coverage cells are represented in a plane of the triangulation diagram as one of point sites. Herein, each of the plurality of coverage cells in the cellular network are mapped via the triangulation diagram into mapped cells and thereby, beneficially, the present method provides a faster and efficient mechanism for determining optimal neighbouring nodes associated with any one of a plurality of nodes (such as, a determined faulty node) of the cellular network via the generated triangulation diagram to enable effective management of the cellular network. It will be appreciated that in some embodiments the triangulation diagram may be generated based on considering a central point of coverage (for example, a median of two opposite ends of corresponding mapped cell) of a given coverage cell, or an arrangement of antennas, as point site instead of the location coordinates of the given coverage cell beings considered as a point site.

It may be understood that, as used herein, the "node" is one of a coverage cell or base station, or a directional antenna associated with each of the plurality of coverage cells of the cellular network. Further, the term "triangulation diagram" as used herein refers to a representation of a plurality of points arranged at arbitrary positions in a certain metric space (or the plane) into defined regions. In an embodiment, the triangulation diagram is a Voronoi diagram. Herein, the Voronoi diagram refers to a partition of a plane into regions (or sub-planes) in vicinity of a given set of objects. The Voronoi diagram may refer to representation of a set of points that divide the plane such that each point is assigned an individual Voronoi cell. Beneficially, the triangulation diagram is used in construction of a discrete model or representation of the plurality of the coverage cells and the associated one or more directional antennas that may be used to define and delineate proximal regions around individual point sites (or base stations) via implementation of polygonal boundaries.

The method further comprises identifying for a target mapped cell, corresponding to a target coverage cell, neighbouring mapped cells from the plurality of mapped cells having a shared boundary in the triangulation diagram. The term "target coverage cell" as used herein refers to a coverage cell requiring immediate management. For example, the target coverage cell may be a cell associated with a faulty base station or antenna, and thereby requiring management to ensure effective and query free operation of the cellular network. The "target mapped cell" refers to representation of the target coverage cell on the triangulation diagram. The term "mapped" as used herein refers to mapping, or representation, of the plurality of coverage cells in the triangulation diagram. Herein, upon mapping the plurality of coverage cells as mapped cells in the triangulation diagram, the neighbouring mapped cells for a target mapped cell (for example, a faulty node) are identified based on shared boundary in the triangulation diagram. Further, each of the neighbouring mapped cells i.e., having a shared or common boundary, with the target mapped cell, are detected for identifying a preferred cell therefrom based on any predefined criterion as described in embodiments of the present disclosure.

In the present embodiments, the triangulation diagram is generated to enable visual identification of neighbouring coverage cells of any faulty coverage cell or antenna based on a predefined criterion. Herein, the triangular diagram provides a vector representation of the cellular network. Notably, the triangulation diagram enables to map the location of the plurality of the coverage cells and the one or more antennas based on the received location coordinates and Azimuths by dividing the area encompassing the cellular network range or the one or more directional antennas into predefined regions, wherein, each division depicts at least one of the plurality of the coverage cells and/or the associated one or more directional antennas. Furthermore, the virtual coordinates for each of the one or more directional antennas may be taken into consideration as one of point sites and thereby arranged to be represented in the plane corresponding to the virtual location coordinates of each coverage cell of the plurality of coverage cells. In an exemplary scenario, for a given finite set of point sites {p1, p2, p3 up to pn} associated with the plurality of coverage cells, each point (pk) has a corresponding triangulation diagram consisting of every point site in the plane whose distance to the point site 'pk' is less than or equal to the distance in comparison to any other point site (or base station) from the plurality of base stations.

Advantageously, the triangulation diagram is used in constructing a discrete model of the plurality of the coverage cells to manage the cellular network (as discussed later in the proceeding paragraphs in more detail). Herein, the triangulation diagram is created by random scattering one of the point sites in a predefined plane, wherein determination of the minimum distance between each of the plurality of coverage cells enables identification of neighbouring point sites (or virtual coordinates of the neighbouring coverage cells) with respect to any given point site 'pk'. Thereby, beneficially, the present method provides a faster and efficient mechanism for determining neighbouring nodes associated with any one of a plurality of nodes (such as, a determined faulty node) of the cellular network via the generated triangulation diagram to enable effective management of the cellular network.

In the present embodiments, the method further comprises determining a length of the shared boundary between the target mapped cell and each one of the neighbouring mapped cells and assigning a ranking to each one of the neighbouring mapped cells based on the corresponding length of the shared boundary with the target mapped cell, with neighbouring mapped cell of the neighbouring mapped cells having comparatively larger of the corresponding length of the shared boundary with the target mapped cell being assigned higher of the ranking. That is, herein, the length of the shared boundaries for each of the neighbouring cells to the target mapped cell are determined and thereby compared to be ranked in a decreasing order i.e., from highest length to lowest length. Alternatively, stated, the predefined criterion is based on the determined lengths of the shared boundaries of the neighbouring mapped cells with the target mapped cell, wherein the mapped cell having the maximum (or highest) determined length of shared boundary may be selected, or assigned a highest rank, whereas the mapped cell having minimum (or lowest) determined length is assigned a lowest rank. It will be appreciated that in other embodiments the predefined criterion may also be based on areas or volumes, commonly occupied by the neighbouring mapped cells with the target mapped cell and may be varied based on the requirements of the implementation.

In an exemplary scenario, to determine a faulty antenna, the number of permutations is logarithmically determined i.e., $(n(n-1))/2$ permutations are possible, wherein 'n' is the number of antennas. For example, in case of n=10000 antennas, a mapping of 49995000 columns and/or rows is required to be generated. However, to reduce the number of computations required to be performed, the present method perform identification of proximal neighbouring cells of the neighbouring cell associated with the target directional antenna i.e., the faulty antenna, only up to a predefined nth level. In other words, by identification of the immediately proximal directional antennas based on the generated triangulation diagram, the present method optimises exponential scalability issue into linear calculations using the generated triangulation diagram (i.e., Voronoi approach). As used herein, the "predefined level" refers to a level of neighbouring cells associated with the target directional antenna with respect to the proximal neighbouring cells. Optionally, the predefined nth level ranges from 1 to 20. In an example, the nth level may be in range of 1, 2, 3, 4, 5, 6, 7, 8, 9, 10, 11, 12, 13, 14, 15, 16, 17, 18 or 19 up to 2, 3, 4, 5, 6, 7, 8, 9, 10, 11, 12, 13, 14, 15, 16, 17, 18, 19 or 20. Notably, each level may comprise two or more directional antennas associated with the target directional antenna, wherein each immediate neighbouring cell of the cell associated with target base station is referred to as the 1st level (or n=1) of the triangulation diagram. Similarly, the neighbouring cell(s) of the 1st level of the triangulation diagram is referred to as a 2nd level of the triangulation diagram, and so forth. Such an implementation results in the densification of a mesh of the triangulation diagram by addition of coverage cells to the immediate neighbour of the target coverage cell representing the target directional antenna, without any need for displacement of the existing coverage cell.

The method further comprises generating a selected neighbour list for the target coverage cell comprising at least one of other of the plurality of coverage cells in the cellular network based on the ranking of the corresponding neighbouring mapped cells. Herein, based on the ranking of the corresponding neighbouring mapped cells, the method further comprises generating the selected neighbour list for the target mapped cell comprising at least one of other of the plurality of coverage cells in the cellular network. Alternatively stated, the mapped cell(s) having the maximum (or highest) determined length of shared boundary may be selected i.e., the highest ranked neighbouring cell is selected for generating the selected neighbour list for further operation. Optionally, the selected neighbour list further comprises backup neighbouring mapped cells, wherein the neighbouring mapped cells ranked preceding the highest ranked neighbouring mapped cell are provided as backup option(s) in the selected neighbour list.

In an embodiment, the method further comprises configuring a base station and/or one or more antennas associated with the target coverage cell based on configuration of corresponding one of base stations and/or one or more antennas associated with the neighbouring mapped cells from the selected neighbour list. Herein, the one or more base station and antennas associated with the target coverage cell are configured based on the neighbouring mapped cells from the selected neighbour list. The configuration may include tuning, shaping, focusing, the directional antenna to improve the performance of the cellular network. Alternatively stated, the inputs such as, power or frequency may be varied based on the arrangement of the one or more antennas based on the triangulation diagram to optimize the performance of the cellular network. Optionally, the method may comprise providing suggestions for re-arrangement of the one or more antennas of any of the plurality of base stations to a preferred artificial coordinate to improve the coverage or performance of the cellular network or minimizing potential interference losses. Beneficially, with this approach of using the triangulation diagram, the present method enables complete and effective coverage of an entire geographical area associated with the cellular network while minimizing interference of signals of neighbouring antennas at the same time to minimize losses and improve the efficiency of the cellular network.

In some embodiments, the method further comprises allocation of physical cell identity (PCI) to a base station and/or one or more antennas associated with the target coverage cell based on allocated PCIs of corresponding one of base stations and/or one or more antennas associated with the neighbouring mapped cells from the selected neighbour list. Herein, the base station and/or one or more antennas associated with the target coverage cell are allocated the PCI based on the allocated PCIs of the neighbouring mapped cell i.e., PCIs of base station and/or antennas associated therewith. The PCI indicates the physical layer identity of target coverage cell and thereby used to uniquely identify each base station and antenna of the plurality of coverage cells in the cellular network. Herein, the method is configured to uniquely allocate PCIs to each of the one or more base station and/or antennas to ensure neighbouring cells have a preferred or different primary sequence allocated for PCI optimization.

In another embodiment, the method further comprises handing over operations of a base station and/or one or more antennas associated with the target coverage cell to corresponding one of base stations and/or one or more antennas associated with the neighbouring mapped cells from the selected neighbour list. This may involve selecting only those of one or more of the identified neighbouring coverage cells which may have configurations similar to the target coverage cell (i.e., the faulty cell or directional antenna) so as to be able to properly overtake (albeit temporarily) functions of the faulty cell or directional antenna in the cellular network, till the time it may be repaired or replaced, or the like. Herein, in case of a faulty coverage cell and/or antenna, the target coverage cell refers to the coverage cell associated with the faulty base station and/or antenna, and for enabling effective operation of the cellular network during the time in which the target coverage cell may become operational such as, after repair or reconfiguration, the operations of the base station and one or more antennas associated with the target coverage cells are handed over to the base station and/or antennas of the neighbouring mapped cells based on the selected neighbour list. The operations may be handed over either to a single neighbouring coverage cell, or uniformly to each of the neighbouring coverage cells, or based on existing conditions or traffic of each of the neighbouring cells. In another embodiment, the method further comprises handing over operations of a base station and/or one or more antennas associated with the target coverage cell to corresponding one of base stations and/or one or more antennas associated with the neighbouring mapped cells from the selected neighbour list with highest of the ranking thereof. In the present embodiment, the operations are handed over to a single neighbouring cell having the highest rank in the selected neighbour list.

In some embodiments, the method further comprises configuring a base station and/or one or more antennas associated with the target coverage cell based on properties of corresponding one of base stations and/or one or more antennas comprising one or more of: frequency of base station and/or one or more antennas, cellular technology of base station and/or one or more antennas, vendor of base station and/or one or more antennas. Herein, the configuration for the one or more antennas associated with the plurality of base stations may include one or more of: directional antenna frequency, directional antenna cellular technology, directional antenna beamwidth, directional antenna vendor. In this regard, the base station has one or more radio frequency RF antennas to transmit and receive signals to the electronic device; for instance, the directional antenna frequency may be in the range of 890 to 915 Megahertz (MHz). The size of the base station and/or directional antenna depends on the size of the area covered and the number of the users connected. The directional antenna cellular technology depends upon the operating technology of the base station. Further, the base station may be operated on 5G bands, 4G bands, 3G bands, and the like.

In some embodiments, the method further comprises storing, in a database, for a base station and/or one or more antennas associated with the target coverage cell, the configuration of corresponding one of base stations and/or one or more antennas associated with the neighbouring mapped cells from the selected neighbour list and the assigned rankings thereto.

The present disclosure also relates to an apparatus for managing the cellular network as described above. Various embodiments and variants disclosed above with respect to the method for managing the cellular network apply mutatis mutandis to the present apparatus. Herein, the apparatus may include at least one server, a database and a computer program stored in a memory, the computer program being configured together with said at least one server to control the apparatus to perform the method as discussed. Further, herein, the database may be used to store information about known configurations of the bases stations, directional antennas, distances therebetween, etc. related to the cellular network.

The present disclosure further relates to a computer program for managing the cellular network as described above. Various embodiments and variants disclosed above with respect to the method for managing the cellular network apply mutatis mutandis to the present computer program. Herein, the computer program is a software program comprising executable instructions to perform one or more operations. In an example, the operations include, but do not limit to, receiving user input, optimizing and operating the apparatus, such as depicting the information regarding the location of the plurality of the base stations, information of the targeted base station and so forth. The software module may be stored as an instruction (algorithm) on a computer-readable medium, such as in the at least one server and executed thereby to operate based on corresponding information. Optionally, the software module is executable in the apparatus. The software module communicates information and commands to the server or processor of the apparatus. Optionally, the computer program is a System, Applications and Products (SAP) module, an enterprise resource planning (ERP) software, and so on.

The memory is a hardware device, also known as storage, storage medium, digital memory unit, or storage media that may store information either temporarily or permanently. Generally, the memory stores data, files, and the like in any format. The memory can be used either internally or externally depending upon the requirement of the method to store data. Beneficially, the stored data can be used to determine the location of the plurality of the base stations. The memory may include, but is not limited to, an electronic storage device, a magnetic storage device, an optical storage device, an electromagnetic storage device, a semiconductor storage device, or any suitable combination of the foregoing. Examples of implementation of memory, but are not limited to, Electrically Erasable Programmable Read-Only Memory (EEPROM), Random Access Memory (RAM), Read Only Memory (ROM), Hard Disk Drive (HDD), Flash memory, a Secure Digital (SD) card, Solid-State Drive (SSD), a computer readable storage medium, and/or CPU cache memory. Optionally, the computer program is implemented as an algorithm, embedded in a software stored in the non-transitory machine-readable data storage medium.

DETAILED DESCRIPTION OF THE DRAWINGS

Figure 1:
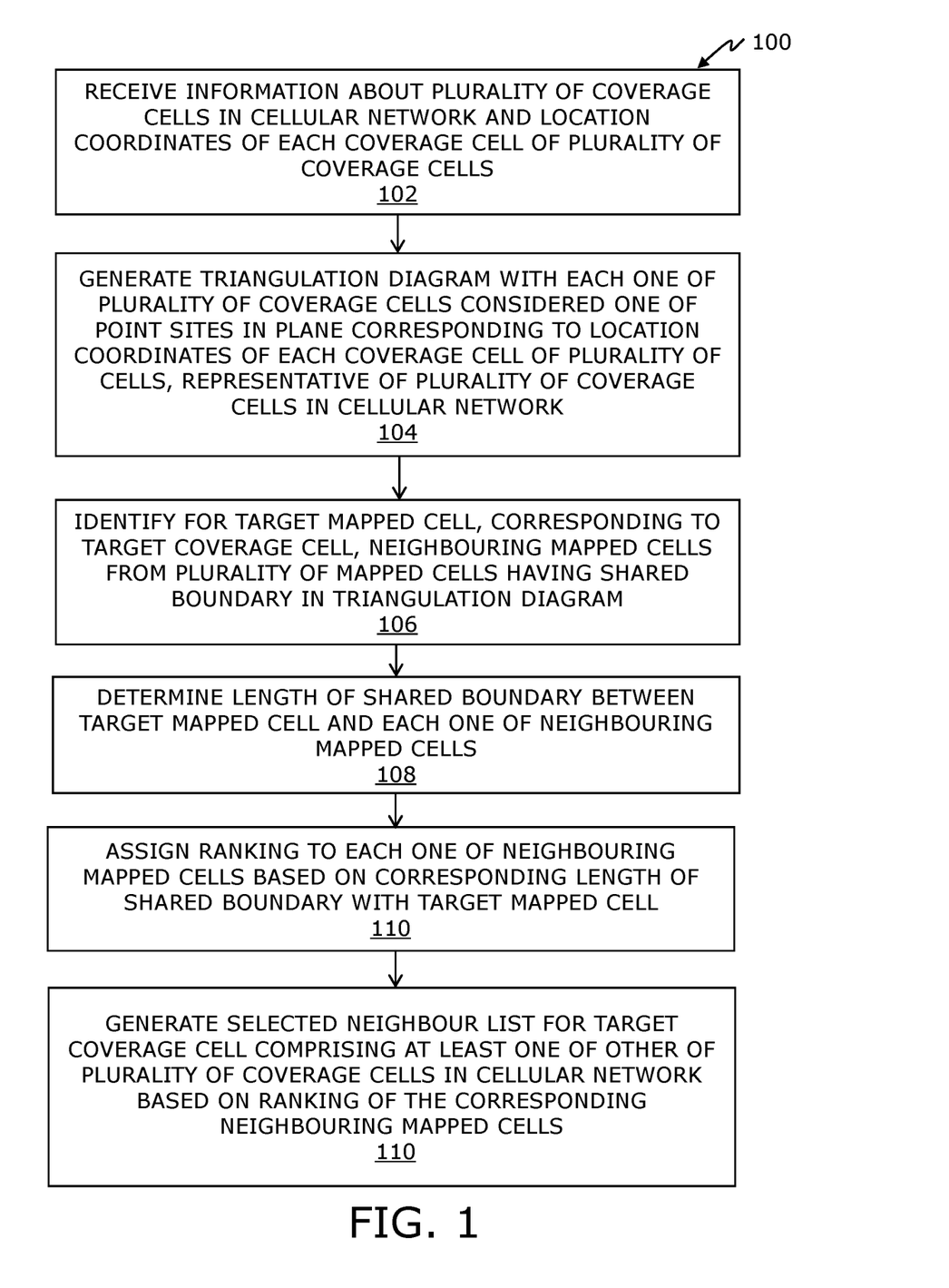
FIG. 1 is a flowchart listing steps involved in a method for managing a cellular network, in accordance with an embodiment of the present disclosure.

Referring to FIG. 1, illustrated is a flowchart listing steps involved in a method 100 for managing a cellular network, in accordance with an embodiment of the present disclosure. As shown, the method 100 comprises steps 102, 104, 106, 108, 110 and 112. At a step 102, the method 100 comprises receiving information about a plurality of coverage cells in the cellular network and location coordinates of each coverage cell of the plurality of coverage cells. At step 104, the method 100 further comprises generating a triangulation diagram 104 with each one of the plurality of coverage cells being considered as one of point sites in a plane corresponding to the location coordinates of each coverage cell of the plurality of coverage cells, the triangulation diagram comprising a plurality of mapped cells representative of the plurality of coverage cells in the cellular network. The generated triangulation diagram is a Voronoi triangulation diagram representative of the plurality of base stations in the cellular network, with each one of the plurality of base stations being considered as one of point sites in a plane corresponding to the location coordinates of each base station of the plurality of base stations. At step 106, the method 100 further comprises identifying for a target mapped cell, corresponding to a target coverage cell, neighbouring mapped cells from the plurality of mapped cells having a shared boundary in the triangulation diagram. At step 108, the method 100 further comprises determining a length of the shared boundary between the target mapped cell and each one of the neighbouring mapped cells. At step 110, the method 100 further comprises assigning a ranking to each one of the neighbouring mapped cells based on the corresponding length of the shared boundary with the target mapped cell, with neighbouring mapped cell of the neighbouring mapped cells having comparatively larger of the corresponding length of the shared boundary with the target mapped cell being assigned higher of the ranking. And, at step 112, the method 100 further comprises generating a selected neighbour list for the target coverage cell comprising at least one of other of the plurality of coverage cells in the cellular network based on the ranking of the corresponding neighbouring mapped cells.

The steps 102, 104, 106, 108, 110 and 112 are only illustrative and other alternatives can also be provided where one or more steps are added, one or more steps are removed, or one or more steps are provided in a different sequence without departing from the scope of the claims herein.

Figure 2:
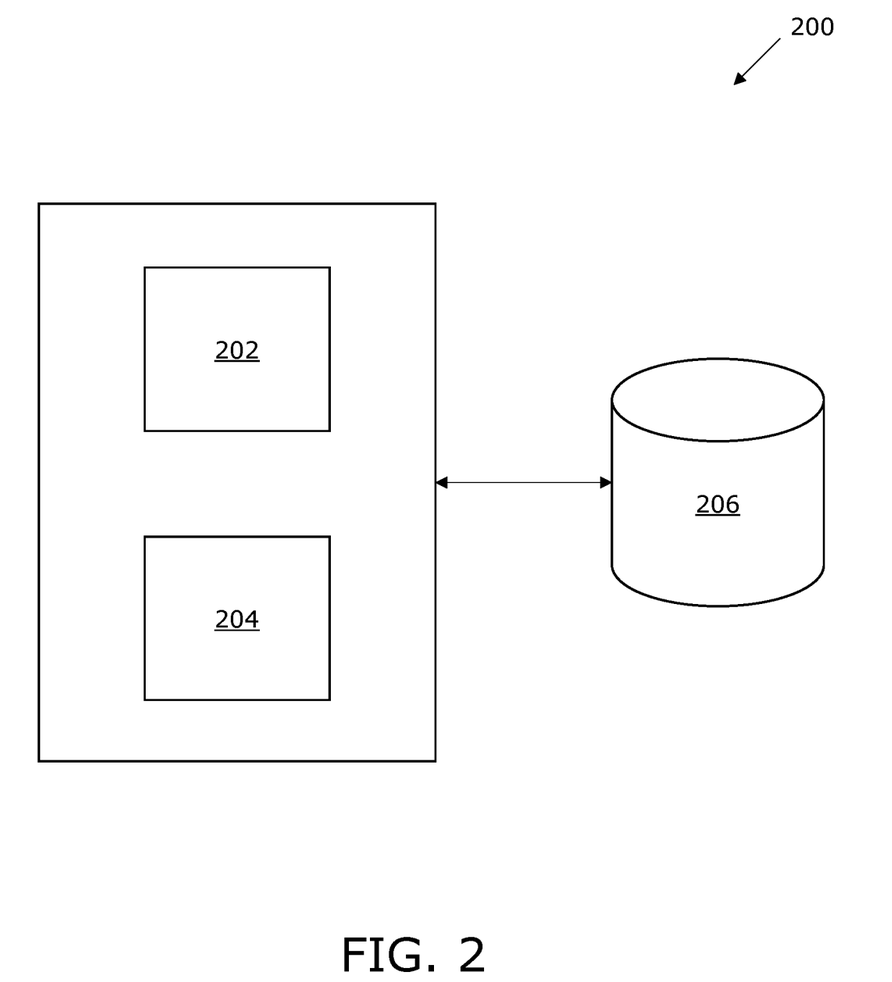
FIG. 2 illustrates is a block diagram of an apparatus for managing the cellular network, in accordance with an embodiment of the present disclosure.

Referring to FIG. 2, illustrated is a block diagram of an apparatus 200 for managing a cellular network, in accordance with an embodiment of the present disclosure. As shown, the apparatus 200 comprises at least one server 202 which may provide a processor for performing various processing functions, a database 206 and a computer program stored in a memory 204, the computer program being configured together with said at least one server 202 to control the apparatus 200 to perform the method 100.

Figure 3A:
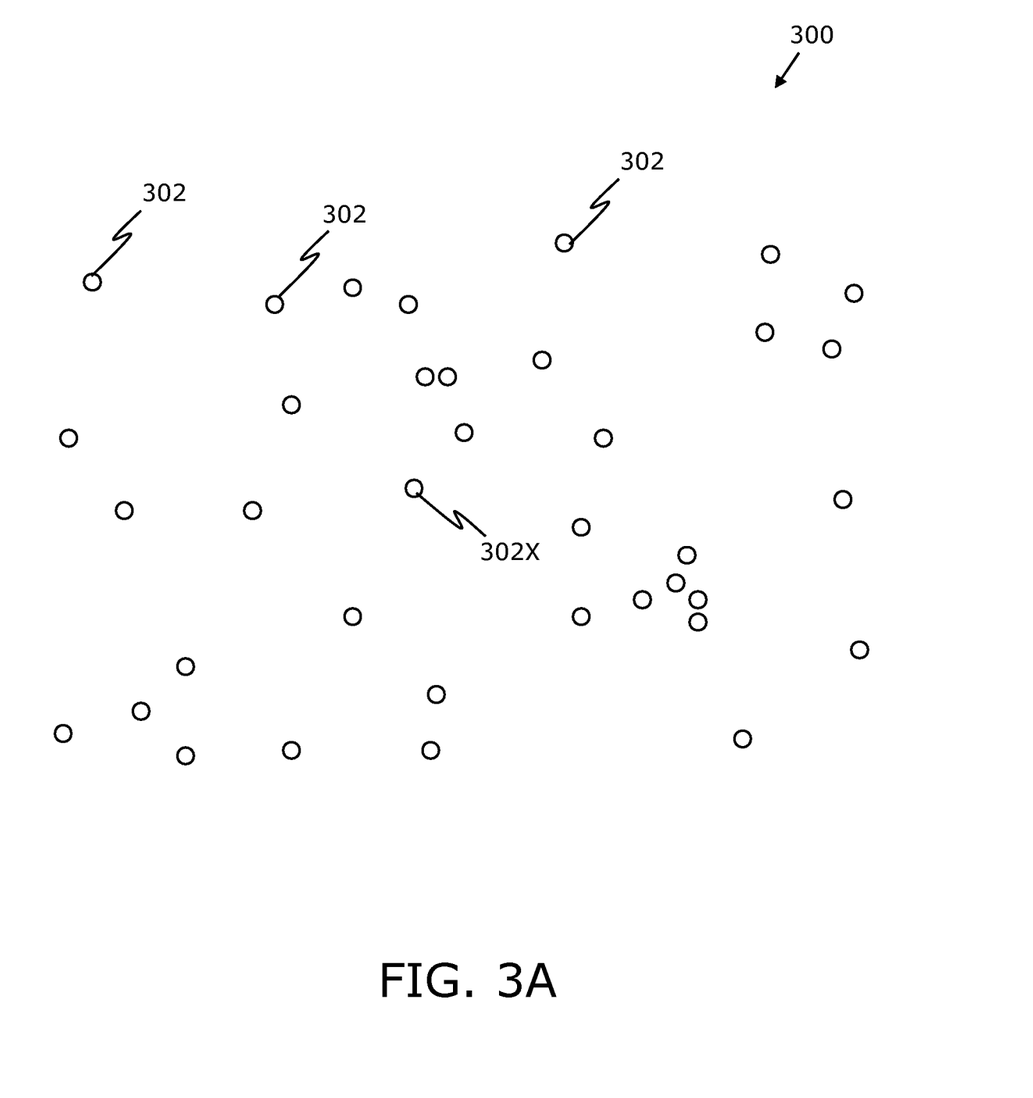
FIG. 3A is an exemplary simplified diagrammatic illustration of a cellular network comprising plurality of coverage cells, in accordance with an embodiment of the present disclosure.

Referring to FIG. 3A, illustrated is a simplified diagrammatic illustration of a cellular network 300 comprising plurality of coverage cells (represented as points which may be centres of respective coverage cells and referred by reference numeral 302), in accordance with an embodiment of the present disclosure. Generally, the cellular networks have thousands of coverage cells comprising multiple base station and antennas; however, for the sake of explanation, a simplified diagrammatic illustration of the cellular network 300 is depicted i.e., only a part of the cellular network 300 is illustrated and similarly other parts of the cellular network 300 may be viewed in such regard. As shown in FIG. 3A, the cellular network 300 comprises plurality of coverage cells 302 as being considered as one of point sites in a plane corresponding to the location coordinates of each coverage cell of the plurality of coverage cells. Herein, as shown, a target coverage cell 302X which may need to be managed may be considered from the cellular network 300.

Figure 3B:
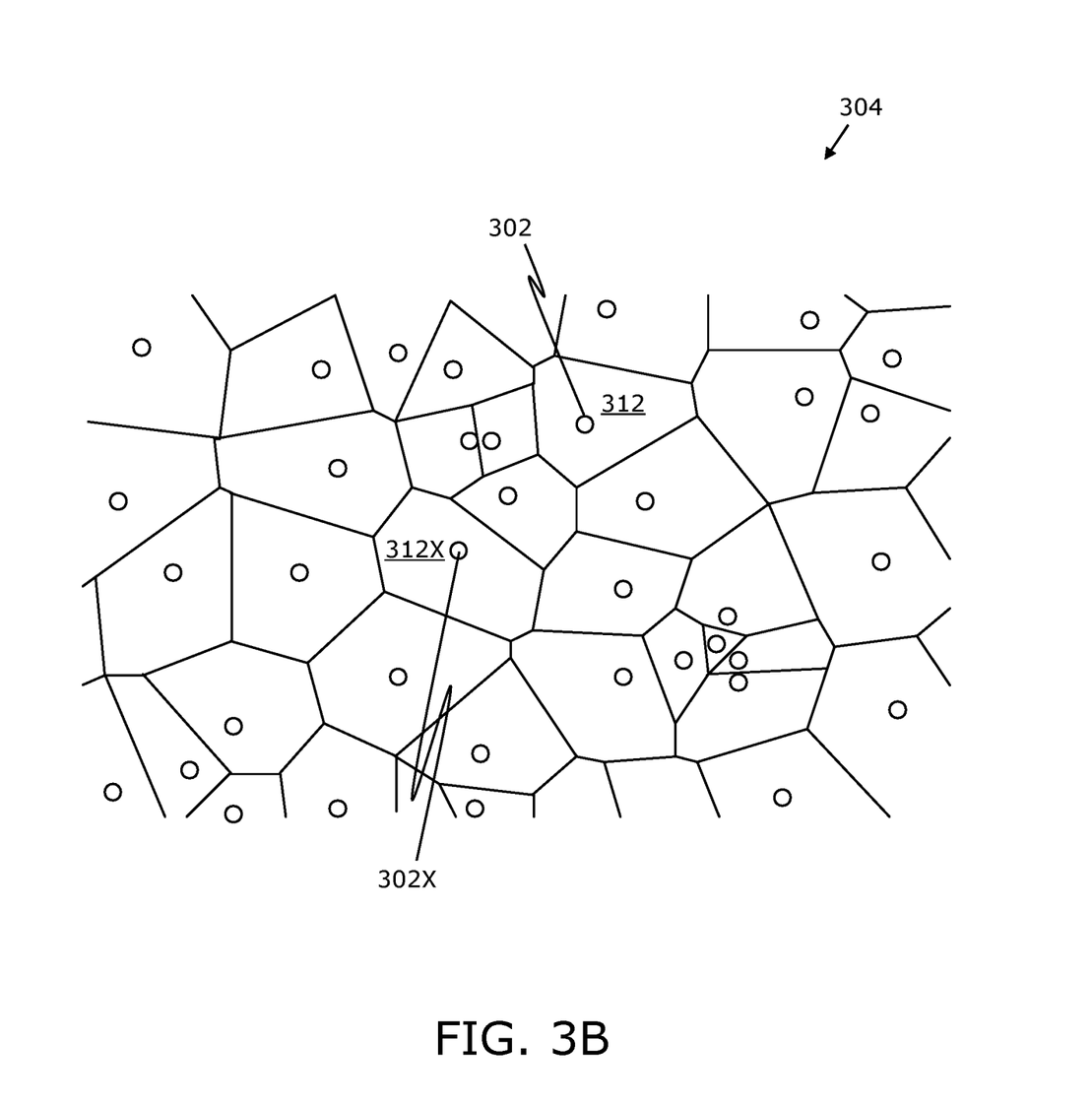
FIG. 3B is a diagrammatic illustration of an exemplary triangulation diagram corresponding to the plurality of coverage cells in the cellular network of FIG. 3A.

Referring to FIG. 3B, illustrated is an exemplary triangulation diagram 304 corresponding to the cellular network 300, in accordance with another embodiment of the present disclosure. As illustrated, for each of the plurality of coverage cells 302, 302X, a triangulation diagram 304 is generated with each one of the plurality of coverage cells 302, 302X being considered as one of point sites in a plane corresponding to the location coordinates of each coverage cell of the plurality of coverage cells 302, 302X. Herein, as shown, the triangulation diagram 304 comprises a plurality of mapped cells 312, 312X representative of the plurality of coverage cells 302, 302X in the cellular network 300.

Figure 3C:
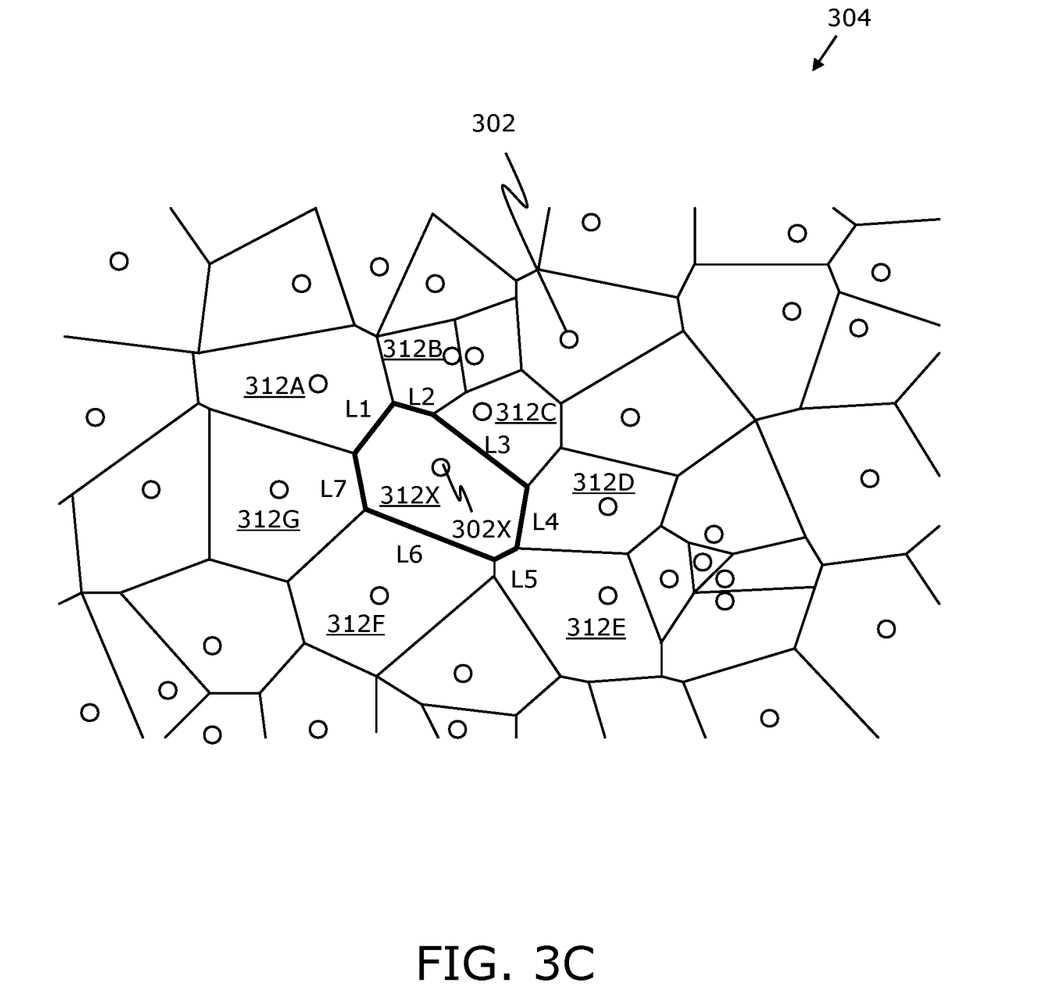
FIG. 3C is a diagrammatic illustration of the triangulation diagram depicting a process for generating a selected neighbour list for a target mapped cell, in accordance with an embodiment of the present disclosure.

Referring to FIG. 3C, illustrated is the triangulation diagram 304 depicting a process for generating a selected neighbour list for a target mapped cell 312X, in accordance with an embodiment of the present disclosure. Herein, the target mapped cell 312X corresponds to the target coverage cell 302X. Herein, the method 100 comprises identifying for a target mapped cell 312X, corresponding to a target coverage cell 302X, neighbouring mapped cells 312A-312G from the plurality of mapped cells 312 having a shared boundary in the triangulation diagram 304. Further, the method 100 comprises determining a length L1-L7 of the shared boundary between the target mapped cell 312X and each one of the neighbouring mapped cells 312A-312G and assigning a ranking to each one of the neighbouring mapped cells 312A-312G based on the corresponding length of the shared boundary with the target mapped cell 312X, with neighbouring mapped cell 312F of the neighbouring mapped cells 312A-312G having comparatively larger of the corresponding length of the shared boundary with the target mapped cell 312X being assigned higher of the ranking. Herein, since the length L6 of the shared boundary of the mapped coverage cell 312F with the target mapped cell 312X is the highest in comparison to other of the plurality of mapped cells 312A, 312B, 312C, 312D, 312E, 312G, the method 100 is configured to assign the corresponding coverage cell 302F the highest ranking. Optionally, the method 100 further comprises give at least one backup coverage cell in case of any issue with the highest ranked coverage cell 302F, wherein the succeeding ranked coverage cells may be used. Herein, since the length L3 of the shared boundary of the mapped coverage cell 312C is greatest amongst other of the plurality of mapped cells 312A, 312B, 312C, 312D, 312E, 312G, the corresponding coverage cell 302C is provided as the backup option. Referring to FIG. 3C, the ranking of the plurality of mapped cells 312A, 312B, 312C, 312D, 312E, 312G may be as follows: 1. L6 (312F), 2. L3 (312C), 3. L4 (312D), 4. L1 (312A), 5. L7 (312G), 6. L2 (312B), 7. L5 (312E).

Modifications to embodiments of the present disclosure described in the foregoing are possible without departing from the scope of the present disclosure as defined by the accompanying claims. Expressions such as "including", "comprising", "incorporating", "have", "is" used to describe and claim the present disclosure are intended to be construed in a non-exclusive manner, namely allowing for items, components or elements not explicitly described also to be present. Reference to the singular is also to be construed to relate to the plural.

The invention claimed is:

1. A method for managing a cellular network, the method comprising:
    receiving information about a plurality of coverage cells in the cellular network and location coordinates of each coverage cell of the plurality of coverage cells;
    generating a triangulation diagram with each one of the plurality of coverage cells being considered as one of point sites in a plane corresponding to the location coordinates of each coverage cell of the plurality of coverage cells, the triangulation diagram comprising a plurality of mapped cells representative of the plurality of coverage cells in the cellular network;
    identifying for a target mapped cell, corresponding to a target coverage cell, neighbouring mapped cells from the plurality of mapped cells having a shared boundary in the triangulation diagram;
    determining a length of the shared boundary between the target mapped cell and each one of the neighbouring mapped cells;
    assigning a ranking to each one of the neighbouring mapped cells based on the corresponding length of the shared boundary with the target mapped cell, with neighbouring mapped cell of the neighbouring mapped cells having comparatively larger of the corresponding length of the shared boundary with the target mapped cell being assigned higher of the ranking; and
    generating a selected neighbour list for the target coverage cell comprising at least one of other of the plurality of coverage cells in the cellular network based on the ranking of the corresponding neighbouring mapped cells.

2. The method according to claim 1 further comprising configuring a base station and/or one or more antennas associated with the target coverage cell based on configuration of corresponding one of base stations and/or one or more antennas associated with the neighbouring mapped cells from the selected neighbour list.

3. The method according to claim 1 further comprising allocation of physical cell identity (PCI) to a base station and/or one or more antennas associated with the target coverage cell based on allocated PCIs of corresponding one of base stations and/or one or more antennas associated with the neighbouring mapped cells from the selected neighbour list.

4. The method according to claim 1 further comprising handing over operations of a base station and/or one or more antennas associated with the target coverage cell to corresponding one of base stations and/or one or more antennas associated with the neighbouring mapped cells from the selected neighbour list.

5. The method according to claim 1 further comprising handing over operations of a base station and/or one or more antennas associated with the target coverage cell to corresponding one of base stations and/or one or more antennas associated with the neighbouring mapped cells from the selected neighbour list with highest of the ranking thereof.

6. The method according to claim 1 further comprising configuring a base station and/or one or more antennas associated with the target coverage cell based on properties of corresponding one of base stations and/or one or more antennas comprising one or more of: frequency of base station and/or one or more antennas, cellular technology of base station and/or one or more antennas, vendor of base station and/or one or more antennas.

7. The method according to claim 1, wherein the triangulation diagram is a Voronoi triangulation diagram.

8. The method according to claim 1 further comprising storing, in a database, for a base station and/or one or more antennas associated with the target coverage cell, the configuration of corresponding one of base stations and/or one or more antennas associated with the neighbouring mapped cells from the selected neighbour list and the assigned rankings thereto.

9. An apparatus comprising at least one server, a database and a computer program stored in a memory, the computer program being configured together with said at least one server to control the apparatus to perform the method according to claim 1.

10. A non-transitory computer readable medium comprising computer executable program code, which when executed controls a computer to perform the method according to claim 1.

* * * * *